(12) United States Patent
Spaggiari

(10) Patent No.: US 7,832,982 B2
(45) Date of Patent: Nov. 16, 2010

(54) CENTRIFUGAL FAN

(75) Inventor: Alessandro Spaggiari, Correggio (IT)

(73) Assignee: Spal Automotive S.r.l., Correggio (Reggio Emilia) (IT)

( * ) Notice: Subject to any disclaimer, the term of this patent is extended or adjusted under 35 U.S.C. 154(b) by 925 days.

(21) Appl. No.: 11/661,554

(22) PCT Filed: Nov. 24, 2005

(86) PCT No.: PCT/IB2005/003585

§ 371 (c)(1),
(2), (4) Date: Mar. 1, 2007

(87) PCT Pub. No.: WO2006/059202

PCT Pub. Date: Jun. 8, 2006

(65) Prior Publication Data

US 2008/0193285 A1 Aug. 14, 2008

(30) Foreign Application Priority Data

Nov. 30, 2004 (IT) .......................... BO2004A0742

(51) Int. Cl.
*F03B 11/02* (2006.01)
*F04D 29/66* (2006.01)
(52) U.S. Cl. .................. 415/119; 415/204; 415/206
(58) Field of Classification Search .......... 415/119, 415/204, 206, 211.2
See application file for complete search history.

(56) References Cited

U.S. PATENT DOCUMENTS

| 3,824,028 | A | * | 7/1974 | Zenkner et al. ............ 415/58.6 |
| 4,025,223 | A | * | 5/1977 | Anders et al. .............. 415/53.1 |
| 4,078,870 | A | * | 3/1978 | Keller et al. ............... 415/53.1 |
| 4,252,502 | A |   | 2/1981 | Scheidel |
| 4,494,908 | A | * | 1/1985 | Hopfensperger ............ 415/206 |
| 5,314,300 | A | * | 5/1994 | Gatley et al. ................ 415/119 |
| 5,316,439 | A | * | 5/1994 | Gatley et al. ................ 415/119 |
| 5,419,680 | A | * | 5/1995 | Asano et al. ................ 415/119 |
| 5,570,996 | A | * | 11/1996 | Smiley, III ................ 415/53.2 |
| 5,813,834 | A | * | 9/1998 | Hopfensperger et al. .... 415/206 |

(Continued)

FOREIGN PATENT DOCUMENTS

DE 92 09 019.2 9/1992

*Primary Examiner*—Edward Look
*Assistant Examiner*—Sean J Younger
(74) *Attorney, Agent, or Firm*—The Nath Law Group; Jerald L. Meyer; Jiaxiao Zhang

(57) ABSTRACT

A centrifugal fan comprises a casing (2) and an impeller (5) that is mounted in the casing (2) and turns about a defined axis of rotation (X). The casing (2) has an axial inlet opening, through which air is drawn in, and a tangential air discharge opening (7). The tangential discharge opening (7) is delimited by a first edge (8) that is substantially parallel with the axis of rotation (X) and is located in the vicinity of the impeller (5), by a second edge (9) opposite the first edge (8) and spaced from the impeller (5) and by two lateral edges (10), each joining the first edge (8) to the second edge (9). The centrifugal fan also comprises an appendage (12) located in the vicinity of the tangential discharge opening (7), delimited by the first edge (8) and having a convex surface (16) inside the casing (2) and a connecting surface (15) between the convex surface (16) and the first stage (8).

11 Claims, 7 Drawing Sheets

U.S. PATENT DOCUMENTS

| | | | |
|---|---|---|---|
| 6,439,839 B1 * | 8/2002 | Song et al. | 415/119 |
| 6,463,230 B1 * | 10/2002 | Wargo | 399/92 |
| 6,821,088 B2 * | 11/2004 | Sakai et al. | 415/204 |
| 6,866,473 B2 * | 3/2005 | Otsuka | 415/119 |
| 7,203,416 B2 * | 4/2007 | Craw et al. | 392/350 |
| 2003/0039541 A1 | 2/2003 | Wargo | |

* cited by examiner

-- PRIOR ART --

CENTRIFUGAL FAN

TECHNICAL FIELD

This invention relates to a centrifugal fan used in particular for automotive applications.

This invention relates preferably to the field of electric fans for ventilating the cabins of motor vehicles, even in combination with air conditioning systems.

BACKGROUND ART

With reference to FIGS. 6a, 6b and 6c, which illustrate an electric centrifugal fan of a type known in prior art, fans of this type comprise a casing "a" that houses an impeller "b" represented schematically in FIG. 6b and connected to an electric motor "c". The casing "a" has an opening (not illustrated) in the side of it to draw air into it in a direction parallel with the axis of rotation of the impeller "b" and a discharge opening "d" through which the impeller "b" blows the air out in a direction "e" tangential to the impeller "b" itself. The discharge opening "d", is delimited by four lateral edges which define a plane "f" perpendicular to the air flowing out and parallel with the air flowing in. More specifically, a first edge "g" is substantially parallel with the axis of rotation "h" of the impeller "b", is located in the vicinity of the impeller "b" and belongs to a first wall "i" parallel with the plane "f" defined by the discharge opening. A second edge "l", parallel with and opposite the first, is spaced from the impeller "b" and belongs to a second wall "m" substantially perpendicular to the plane "f" defined by the discharge opening "d". Two lateral edges "n", each joining the first edge "g" to the second edge "l", belong to opposite walls "o" perpendicular to the axis of rotation "h" of the impeller "b". Disadvantageously, all the edges "g, l, n" have sharp edges. Also, the casing "a" is closed by a curved wall "p" which joins the first wall "i" to the second wall "m" and, together with the impeller "b", delimits a duct "q" that diverges towards the discharge opening "d".

In the modern automotive industry, in particular in the field of luxury car production, driving comfort has reached very high levels in terms of both the car's dynamic behaviour and noise. Having attained extremely high levels of soundproofing against outside noise, designers are now concentrating their attention on noise inside the cabin or in parts of the car near the cabin such as, for example, the noise made by the fans of the car's air conditioning and/or heating system.

In this regard, the Applicant has found that fans of the type described above can be improved in several ways, especially as regards the noise made by the air flowing against the sharp edges of the fan. This noise disturbs the driver and passengers.

DISCLOSURE OF THE INVENTION

In this situation, the basic technical task of the present invention is to provide a centrifugal fan that is silent.

The technical task and specified aims are substantially fulfilled by a centrifugal fan characterised in that it comprises one or more of the technical solutions defined in the appended claims.

BRIEF DESCRIPTION OF THE DRAWINGS

Below is a description of a preferred, non-limiting embodiment of a centrifugal fan illustrated in the accompanying drawings, in which.

DETAILED DESCRIPTION OF THE PREFERRED EMBODIMENTS OF THE INVENTION

Figure 1:
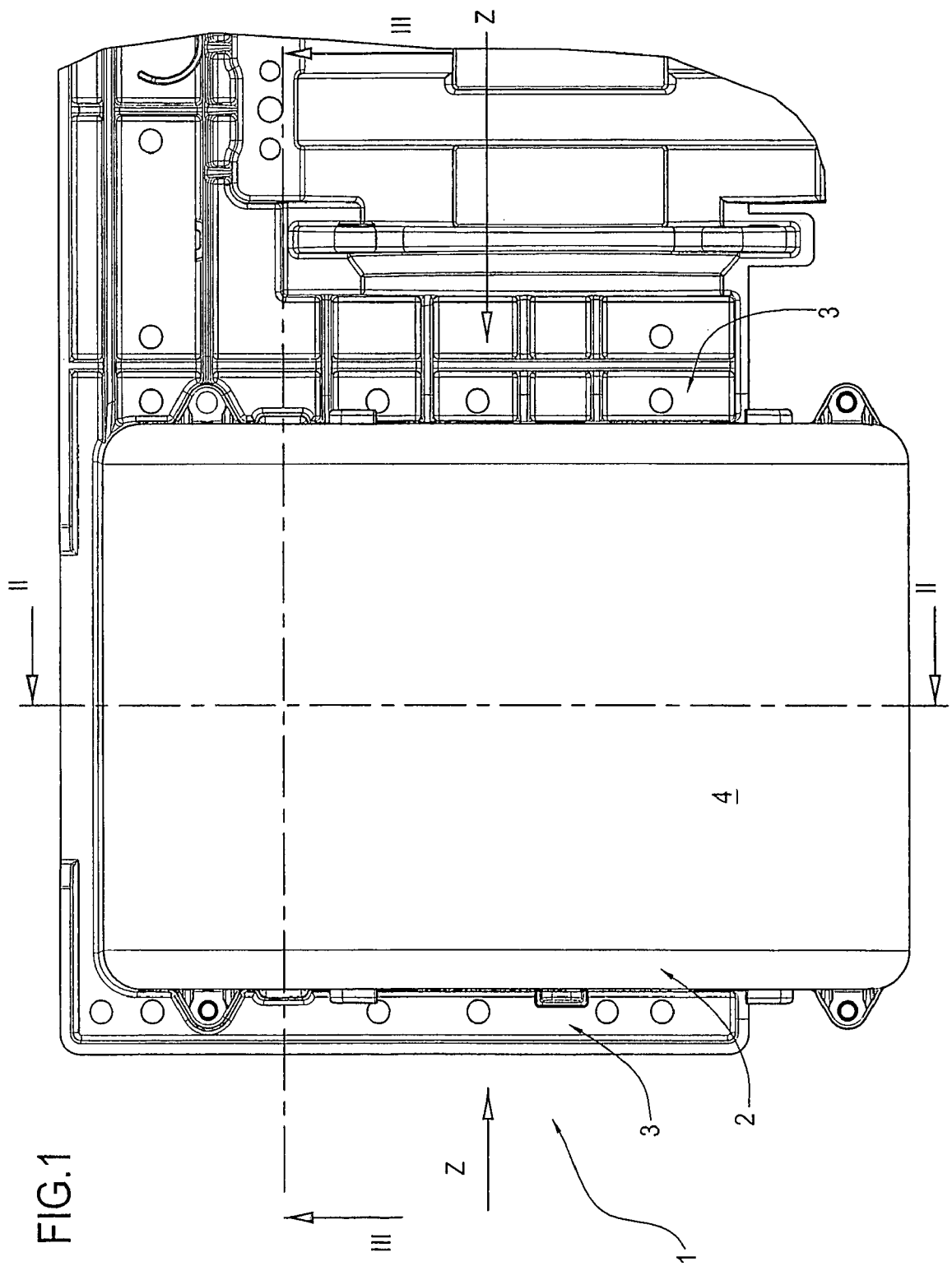
FIG. 1 is a plan view of a centrifugal fan according to the present invention.

With reference to the accompanying drawings, the numeral 1 denotes in its entirety a centrifugal fan according to the invention. The centrifugal fan 1 comprises a casing 2 delimited by pair of parallel side walls 3 and a connecting wall 4 that joins the two side walls 3 and extends preferably and principally in a spiral direction (FIG. 2).

The casing 2 houses an impeller 5, represented schematically in the drawings, whose hub 6 is connected to an electric motor (not illustrated) which is mounted outside the casing 2 and which drives the impeller 5 rotationally about a defined axis of rotation "X" in a predetermined direction "R". According to well-known designs, the impeller 5 comprises a plurality of vanes (not illustrated) connected to the hub 6. The vanes may be of any type and their shape, number and size shall not restrict the scope of the invention.

Figure 2:
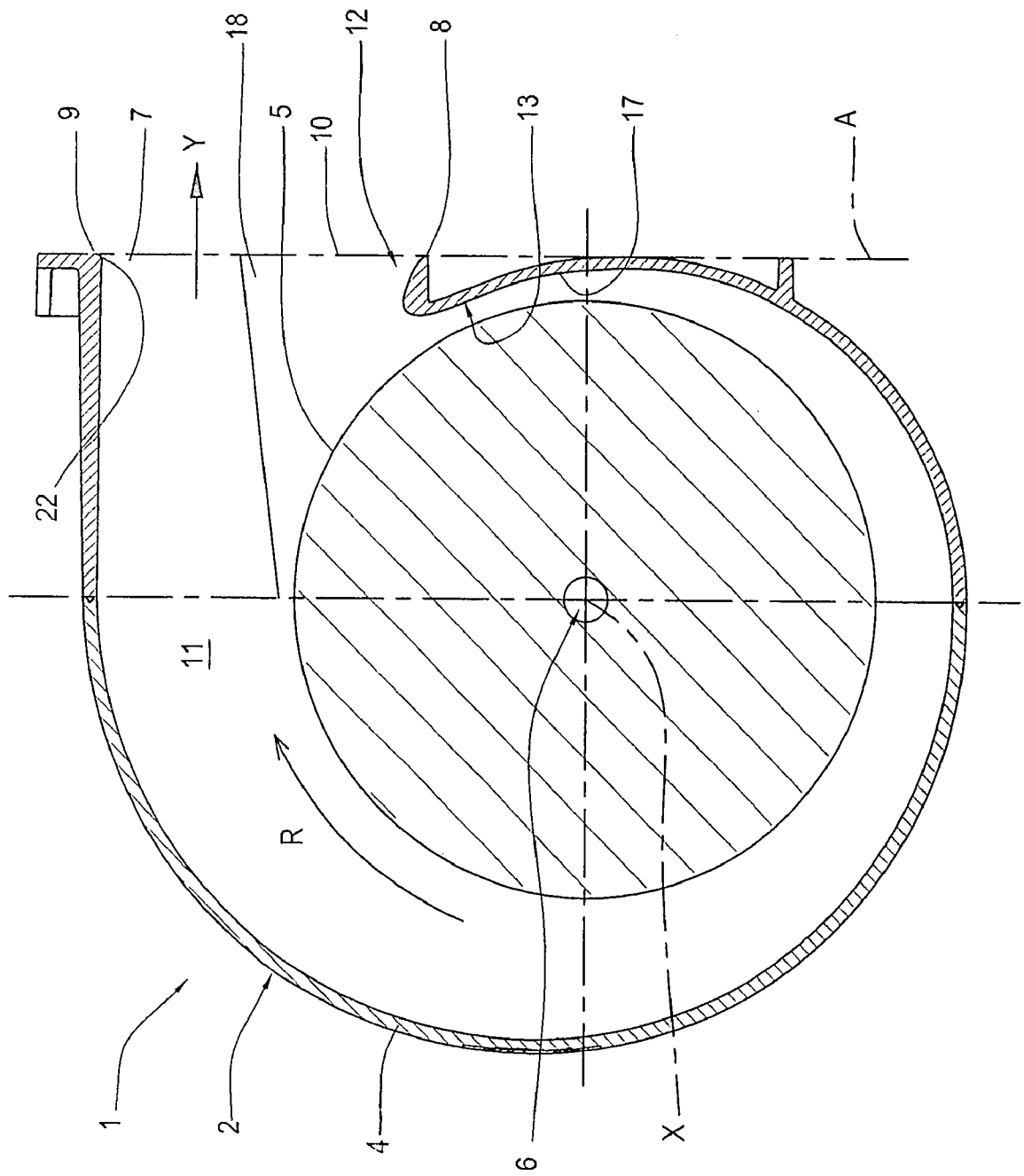
FIG. 2 is a cross section of the fan according to the invention through line II-II of FIG. 1.

The casing 2 has an axial inlet opening, made in both side walls 3 and indicated by an arrow "Z" in FIG. 1, through which air is drawn in by the impeller 5, and a tangential discharge opening 7 through which the air is blown out by the impeller 5 in a tangential discharge direction "Y" (FIG. 2).

The tangential discharge opening 7 is made in the connecting wall 4. Looking in more detail, the tangential discharge opening 7 is delimited by a first edge 8 that is substantially parallel with the axis of rotation "X" and is located in the vicinity of the impeller 5, by a second edge 9 opposite the first edge 8 and spaced from the impeller 5 and by two lateral edges 10, each joining the first edge 8 to the second edge 9. These edges 8, 9 and 10 define a plane "A" in which the discharge opening 7 lies. The plane "A" is parallel with the axis of rotation "X" and perpendicular to the tangential discharge direction "Y" of the air.

The impeller 5 and the casing 2 delimit a duct 11 that extends around the impeller 5 itself and diverges towards the discharge opening 7 in the rotation direction R.

Advantageously and unlike prior art fans, the centrifugal fan 1 according to this invention also comprises an appendage 12 located in the vicinity of the tangential discharge opening 7. The appendage 12 is delimited by the first edge 8 and has a convex surface 16 inside the casing 2 and connected to the first edge 8 by a transition surface 15.

The appendage 12 therefore extends between the two side walls 3 and lies parallel with the axis of rotation "X".

The convex surface 16 is also connected to an inside surface 17 belonging to the connecting wall 4 of the casing 2 at a transition area 13. The diverging duct 11 extends from the transition area 13 and is delimited by the inside surface 17, by the impeller 5 and by the side walls 3.

Figure 4:
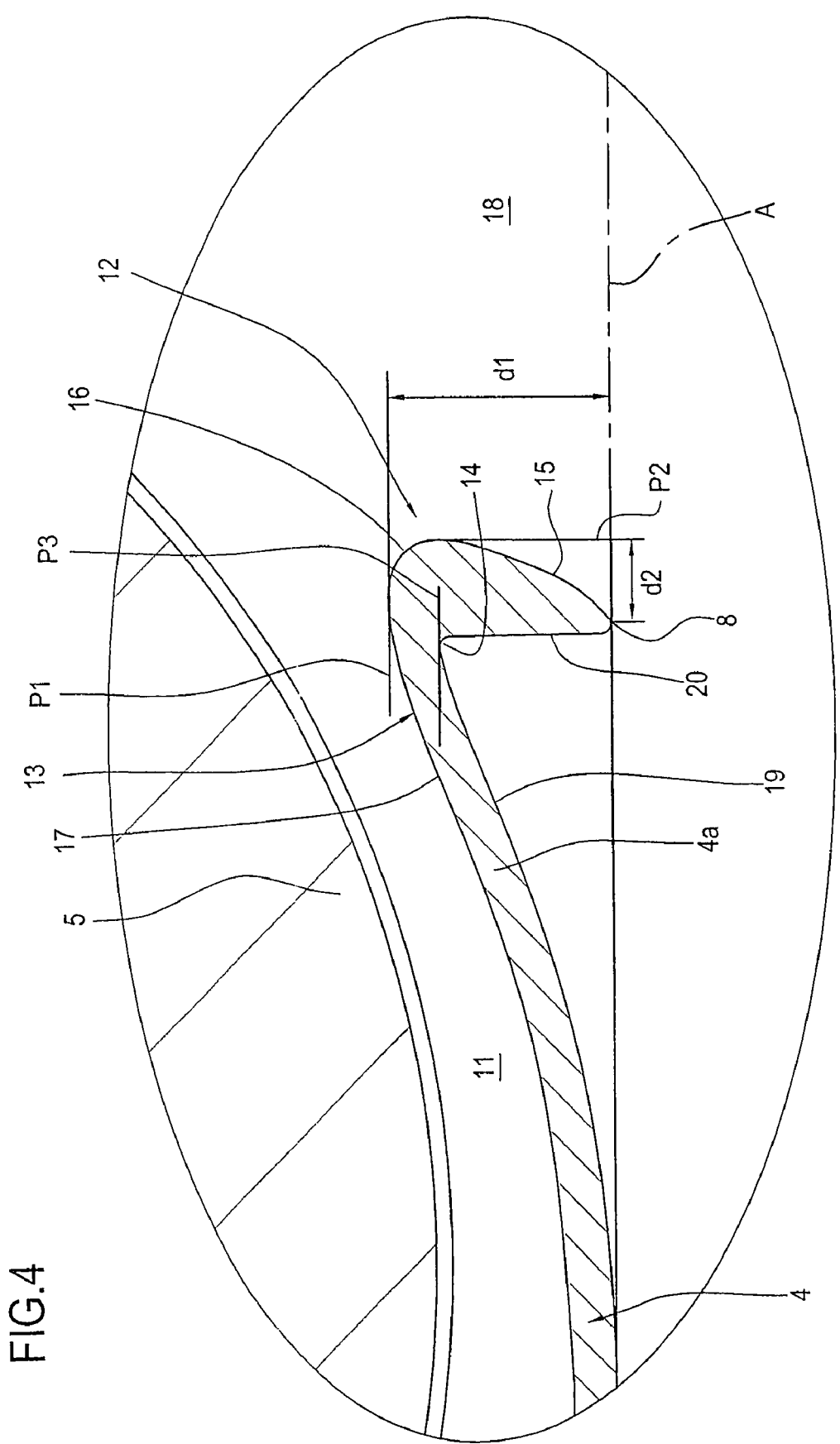
FIG. 4 shows a first scaled-up detail of the centrifugal fan of FIG. 1.
Figure 4A:
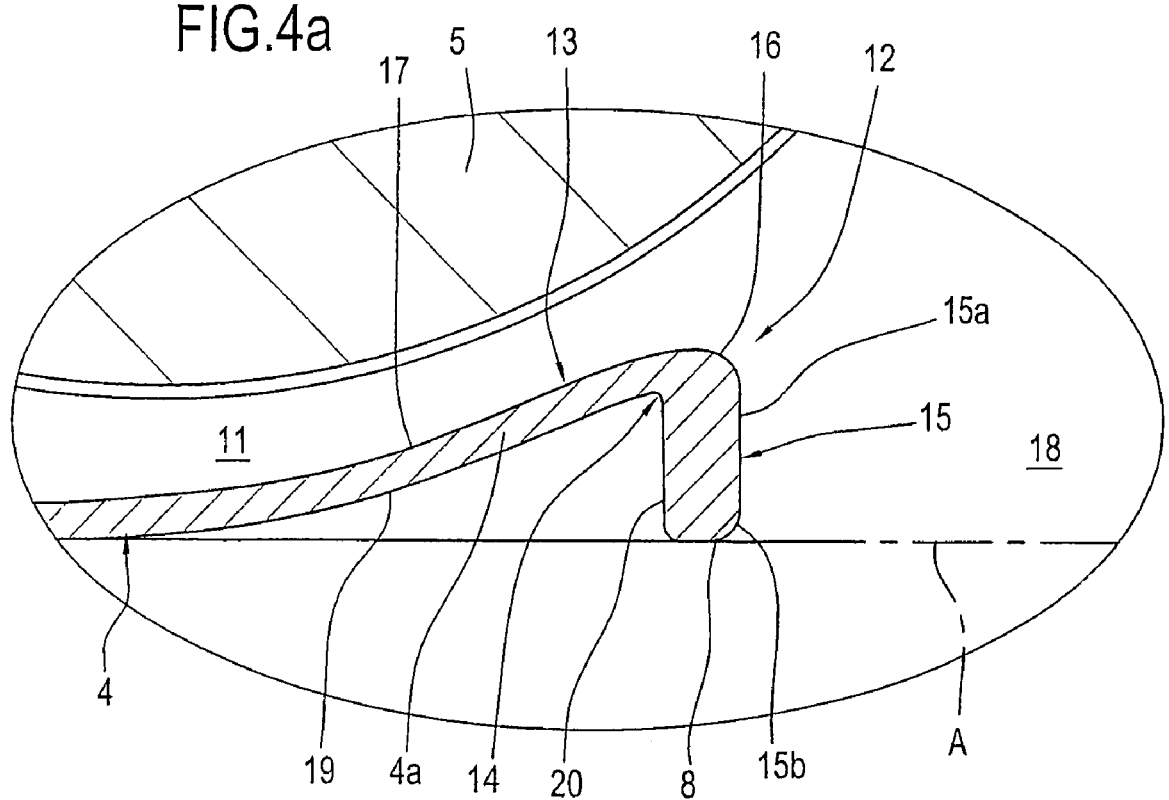
FIG. 4a shows a first alternative embodiment of the first scaled-up detail of FIG. 4.
Figure 4B:
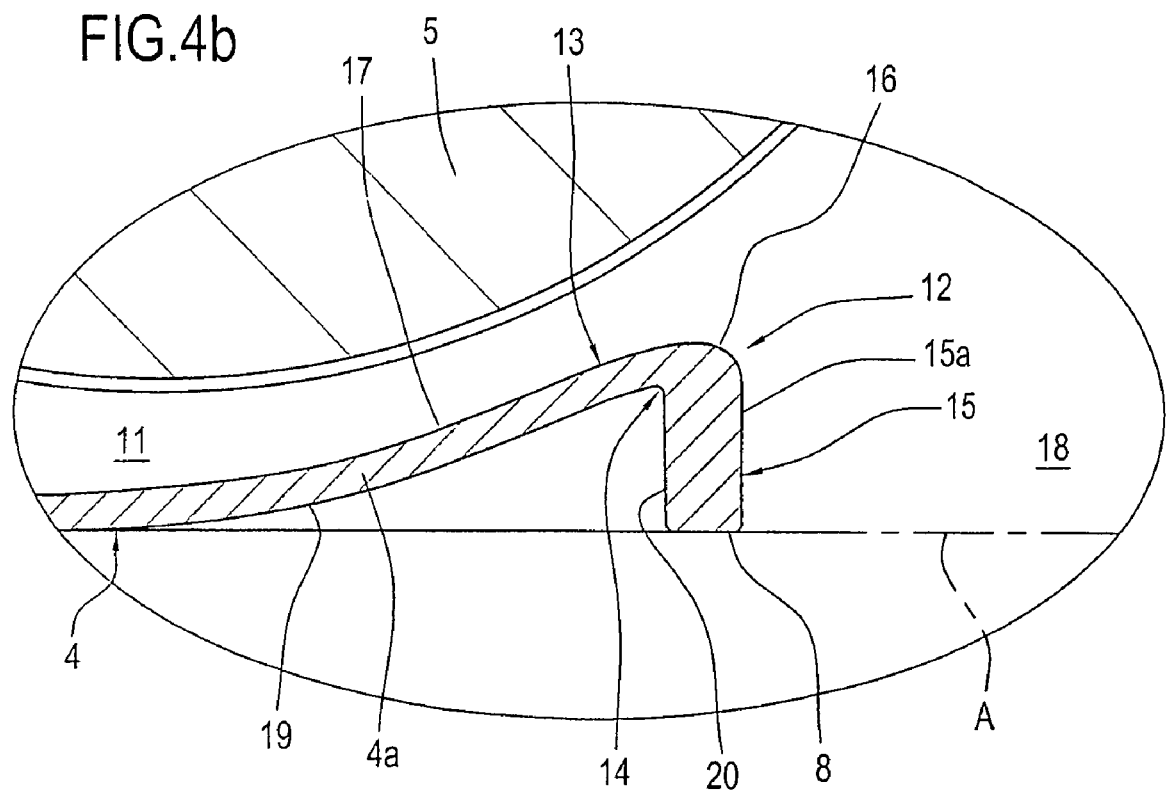
FIG. 4b shows a second alternative embodiment of the first scaled-up detail of FIG. 4.

Preferably, for moulding convenience, as illustrated in FIGS. 4, 4a and 4b, which show three non-restricting embodiments, the cross section of the appendage 12 transversal to the axis of rotation "X" is substantially hook-shaped. On the side of it opposite the convex surface 16, the hook-shaped appendage 12 forms, outside the casing 2, a concave surface 14 which blends into the first edge 8 and which therefore coincides with the end of the hook itself.

In the embodiment illustrated in FIG. 4, the transition surface 15 is also curved outwardly and has a smaller curvature, and hence a larger curvature radius, than the convex surface 16.

Further, as shown in FIGS. 2 and 4, the convex surface 16 and the transition surface 15, together with the second edge 9, delimit a diverging discharge duct 18 that acts as a diffuser.

The concave surface 14 of the hook blends into an outside surface 19 belonging to the connecting wall 4 of the casing 2.

Preferably, the first edge 8 is also rounded and blends into the concave surface 14 and into the transition surface 15 in such a way that the hook does not have any sharp edges.

The cross section of the appendage 12, transversal to the axis of rotation "X", also comprises a straight section 20 which joins and blends the concave surface 14 outside the casing 2 into the first edge 8. The straight section 20 is substantially parallel with the tangential direction "Y" of air discharge from the discharge opening 7. The extension of the straight section 20 is such that, in the vicinity of the appendage 12, the inside surface 17 and the outside surface 19 of the casing 2 delimit a wall 4a belonging to the connecting wall 4, having a constant thickness and partly surrounding the impeller 5.

Where "$P_1$" is the plane parallel to the plane "A" and tangent to the convex surface 16, "$P_2$" the plane perpendicular to the plane "A" and tangent to the transition surface 15, "$d_1$" the distance between the plane "$P_1$" and the plane "A", and "$d_2$" the distance between the plane "$P_2$" and the first edge 8 at the point of tangency with the plane "A", the ratio between "$d_1$", and "$d_2$" is preferably between 1.5 and 3.

In a first alternative embodiment, illustrated in FIG. 4a, the transition surface 15 differs from the embodiment of FIG. 4 in that it has a flat portion 15a that is blended into the convex surface 16 and a curved transition section 15b between the flat portion 15a and the first edge 8.

Further, the first edge 8 is defined by a flat surface perpendicular to the flat portion 15a belonging to the transition surface 15.

The second alternative embodiment illustrated in FIG. 4b differs from the one of FIG. 4a in that it does not have the curved transition section 15b.

In both the alternative embodiments illustrated in FIGS. 4a and 4b, the flat portion 15a is parallel with the tangential direction of discharge "Y". Therefore, the discharge duct 18 is not divergent but constant in section.

Figure 3:
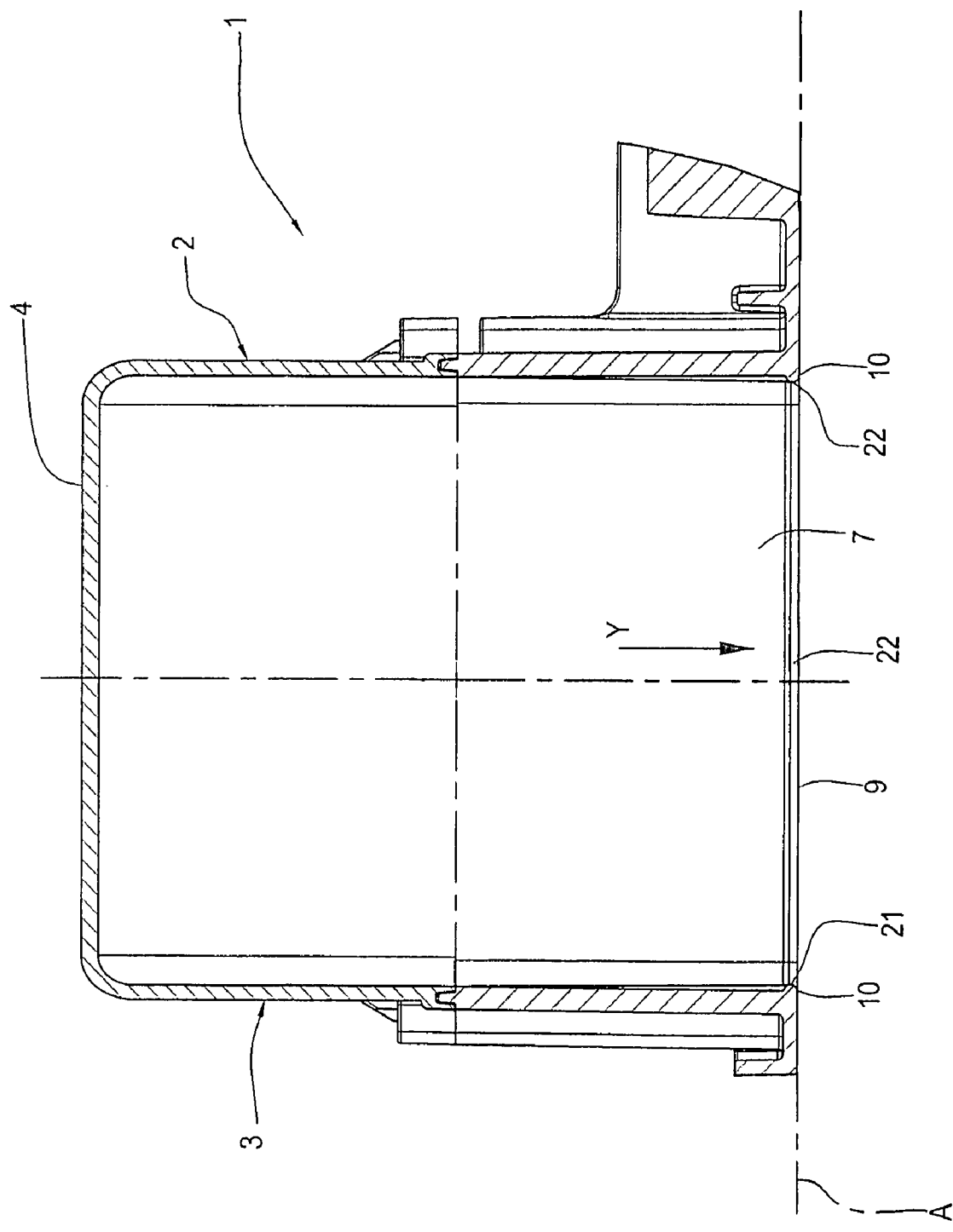
FIG. 3 is a cross section of the fan according to the invention through line III-III of FIG. 1.
Figure 5:
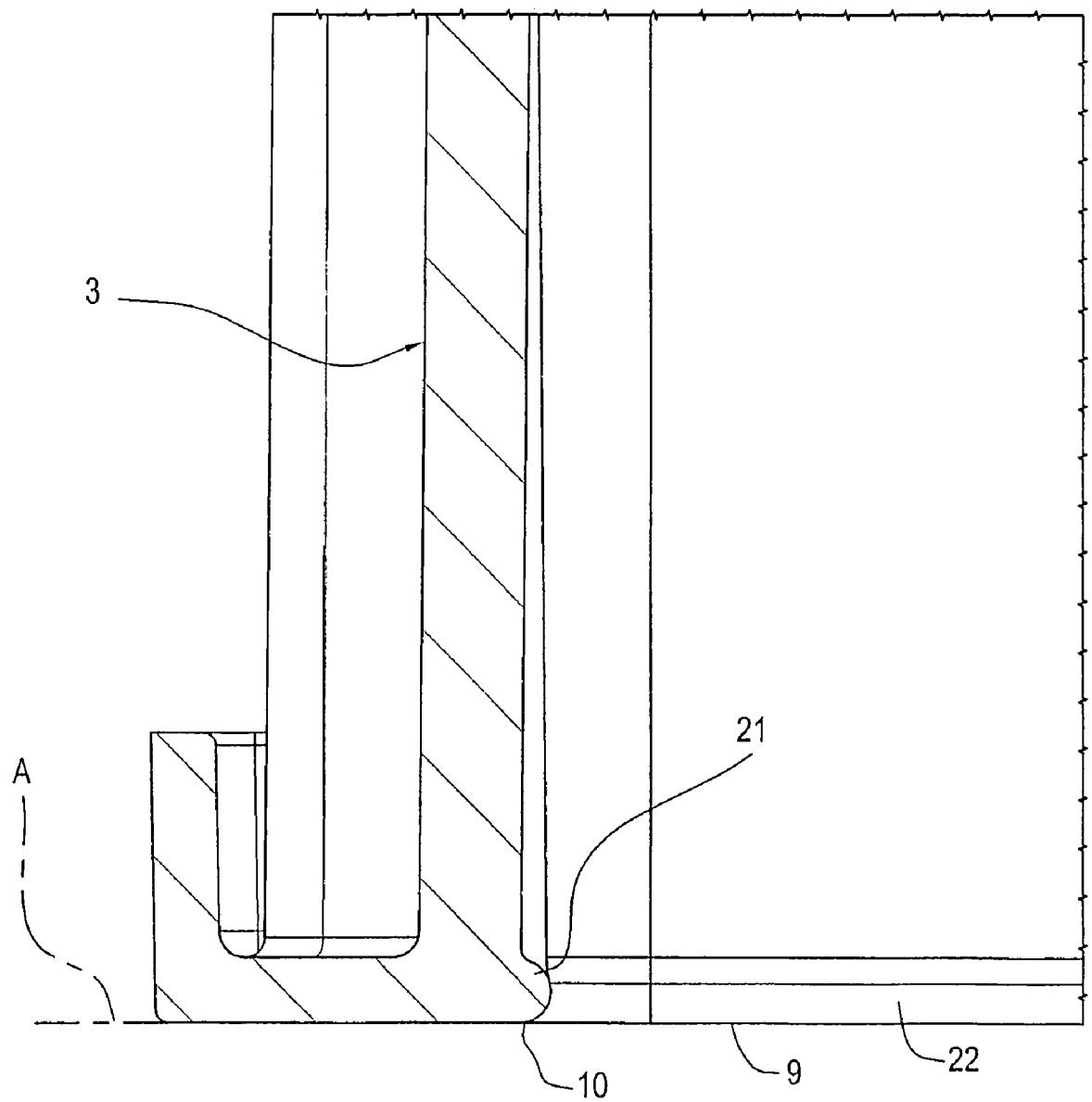
FIG. 5 shows a second scaled-up detail of the centrifugal fan of FIG. 1.
Figure 6A:
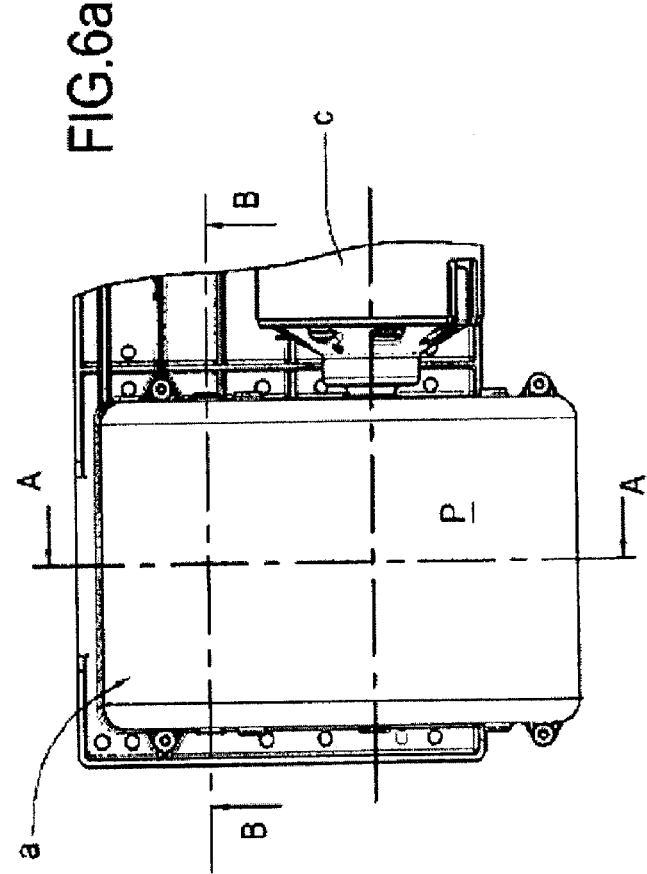
FIGS. 6a, 6b and 6c are different views of a prior art centrifugal fan.
Figure 6C:
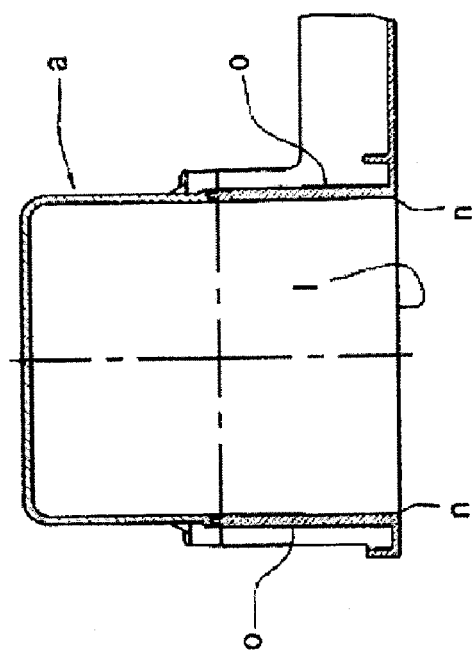
Figure 6B:
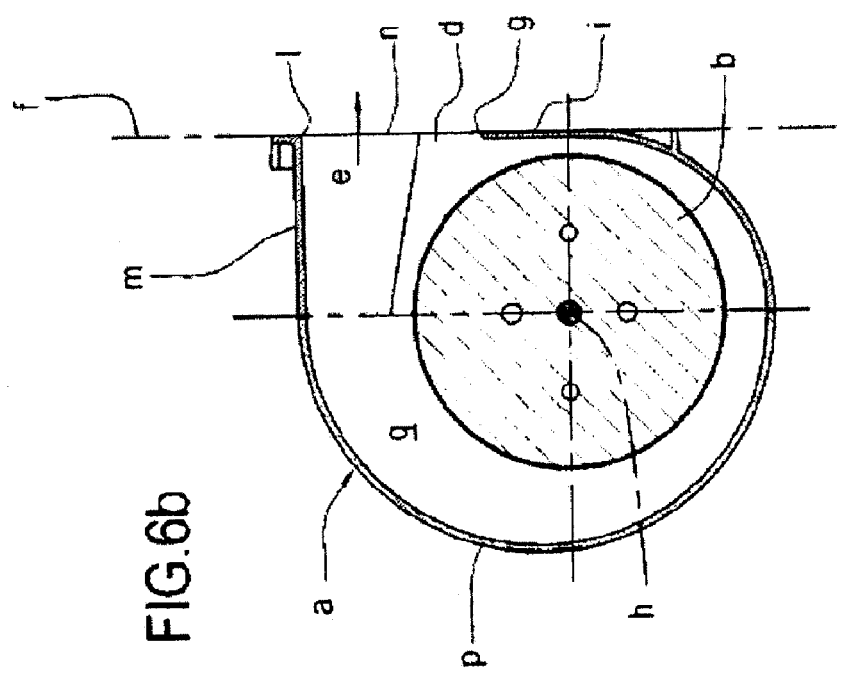

To further reduce the noise, made by the fan 1, the latter comprises a protrusion 21, preferably with a rounded shape, that extends along each of the lateral edges 10 towards the opposite lateral edge 10 (FIGS. 3 and 5) and a fillet 22 to round the second edge 9 (FIG. 2). As clearly shown in cross section in FIG. 5, the protrusion 21 is shaped like a semicircle that blends into the adjacent walls without forming sharp edges. Each of the protrusions 21 on the lateral edges 10 extends smoothly from the fillet 22 of the second edge 9, to form a single frame around the three edges 9, 10. Therefore, the protrusions 21 and the fillet 22 may have the same shape.

The invention fulfils the proposed aim and achieves important advantages.

The special shape of the appendage located on the first edge reduces swirling at the air discharge opening, thereby diminishing noise made by the air flow. The noise is further reduced by the rounded protrusions made around each of the lateral edges and by the fillet on the second edge.

The invention claimed is:

1. A centrifugal fan comprising:
   a casing; and
   an impeller that is mounted in the casing and turns about a defined axis of rotation,
   the casing having an axial inlet opening, through which air is drawn in, and a tangential air discharge opening through which the air is blown out, the tangential discharge opening being delimited by a first edge that is substantially parallel with the axis of rotation and is located in the vicinity of the impeller, by a second edge opposite the first edge and spaced from the impeller and by two lateral edges, each joining the first edge to the second edge;
   the centrifugal fan further comprising an appendage located in the vicinity of the tangential discharge opening, delimited by the first edge and having a convex surface inside the casing and a transition surface between the convex surface and the first edge; and
   the centrifugal fan further comprising a protrusion, extending along each lateral edge towards the opposite lateral edge, forming a single rounded shape frame along the second edge and along the two lateral edges.

2. The fan according to claim 1, characterised in that the transition surface is outwardly curved and has a curvature that is smaller than the curvature of the convex surface.

3. The fan according to claim 1, characterised in that the transition surface is outwardly curved and has a flat portion that blends into the convex surface.

4. The fan according to claim 3, characterised in that the transition surface also has a curved transition section between the flat portion and the first edge.

5. The fan according to claim 1, characterised in that the convex surface blends into a surface inside the casing.

6. The fan according to claim 1, characterised in that the convex surface and the transition surface, together with the second edge, delimit a diverging discharge duct.

7. The fan according to claim 1, characterised in that the first edge is rounded.

8. The fan according to claim 1, characterised in that the first edge is defined by a flat surface.

9. The fan according to claim 1, characterised in that, starting from a transition area between the convex surface and the inside surface of the casing, the inside surface of the casing and the impeller delimit a diverging duct extending around the impeller.

10. The fan according to claim 1, characterised in that, in the vicinity of the appendage, the inside surface and the outside surface of the casing delimit a wall with a constant thickness.

11. The fan according to claim 1, characterised in that the second edge has a fillet for rounding the second edge.

* * * * *